Sept. 20, 1932.  E. A. STALKER  1,878,723

AIRPLANE CONSTRUCTION

Filed Nov. 29, 1929

Inventor
Edward A. Stalker

Patented Sept. 20, 1932

1,878,723

UNITED STATES PATENT OFFICE

EDWARD A. STALKER, OF ANN ARBOR, MICHIGAN

AIRPLANE CONSTRUCTION

Application filed November 29, 1929. Serial No. 410,520.

My invention relates to means of utilizing the wings which attain large lifting power at large angles of attack.

At present it is impractical to rotate the fuselage and wing jointly through angles greater than 18 degrees approximately. It is possible, however, to incorporate in an airplane, wings which will give very large lifts at angles several times larger than now in use. Such a wing is set forth in my Patent No. 1,691,942 Serial No. 218,906. The object of my invention is to provide a mechanism which will rotate the wings relative to the fuselage so that angles relative to the wind may be obtained from approximately 18 degrees upward.

Figure 1:
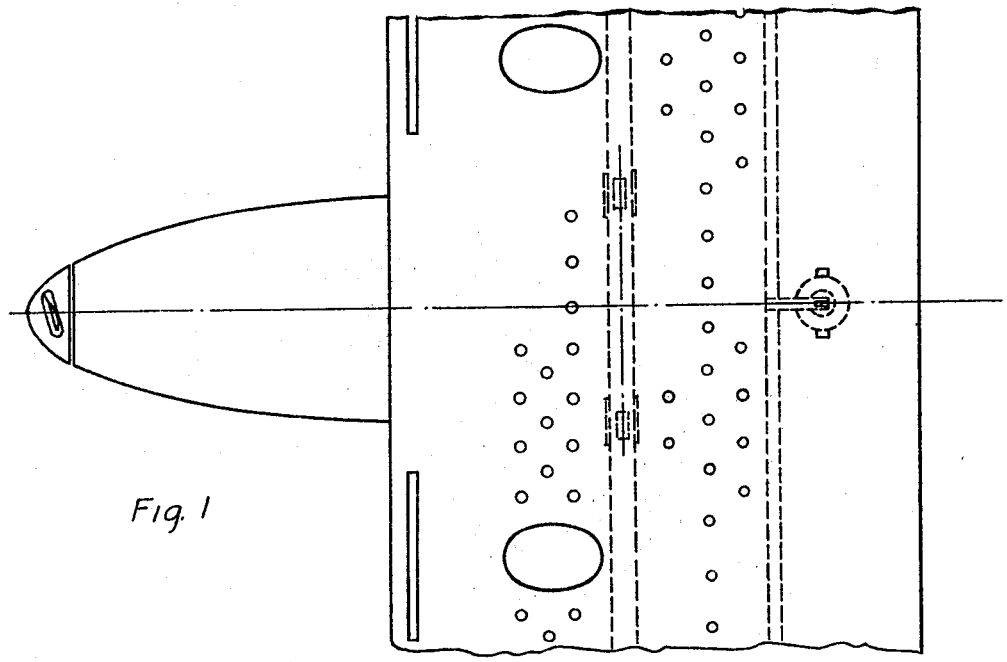
Figure 2:
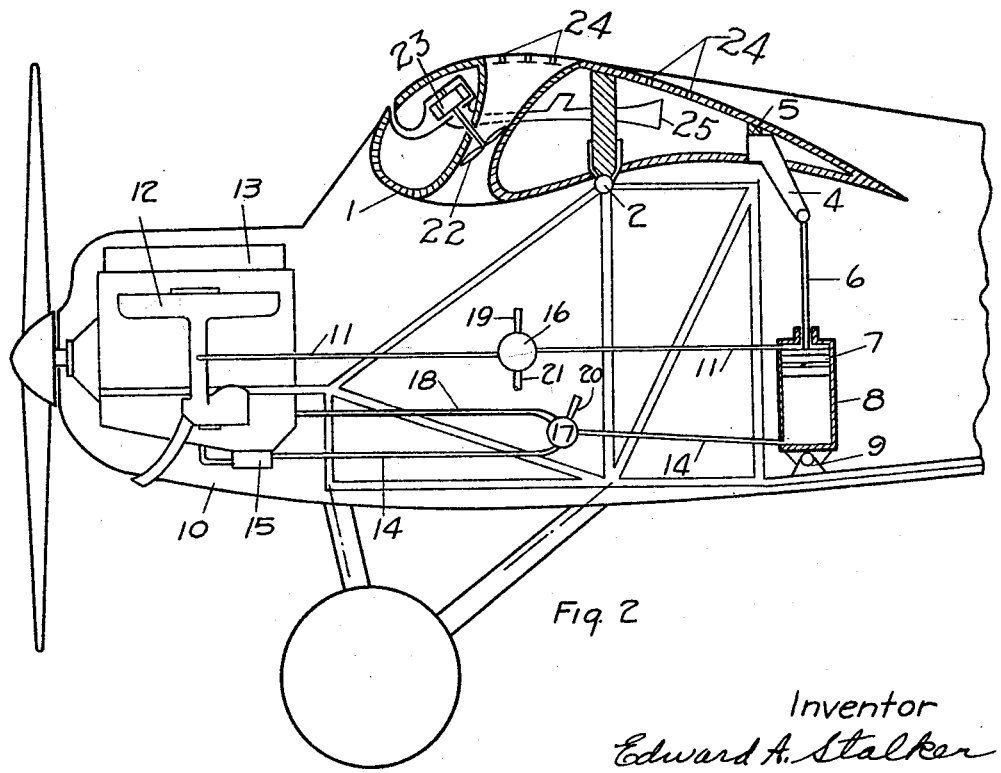

I attain this object by the mechanism illustrated in the accompanying drawing in which Figure 1 is a plan view of the airplane and Figure 2 represents the airplane in section.

In Figure 2 the wing 1 is hinged at 2 and supported near the rear by the bracket 4 attached to the rear spar 5. The bracket 4 is hinged to the rod 6 which carries the piston 7 operating in the cylinder 8. The cylinder is attached at 9 to the fuselage 10. At the top of the cylinder a tube 11 leads to the manifold 12 of the engine 13. Another tube 14 leads from the bottom of the cylinder to the oil pump 15.

A three way valve 16 is in the tube 11. Another three way valve 17 is in the tube 14. A tube 18 leads back to the crank case of the engine. The valves have handles 19 and 20 which permit manual operation but in general they are not used and the valves each present a continuous passage from the cylinder to the part of the engine to which they connect. The pump 15 causes a pressure in the cylinder 8, and the manifold 12 causes a reduced pressure above the piston 7. Both the pressure and the suction hold the wing in the attitude indicated but should the engine stop the pressures will disappear and the wing will assume a large angle relative to the fuselage as soon as the pilot increases the angle of the fuselage relative to the wind. Thus in case of engine failure landing may be made at a very slow speed since the wing will automatically assume a large angle of attack. The valves 16 and 17 are provided to give manual control when it is desirable to interrupt the automatic arrangement. Valve 16 by-passes to the atmosphere through 21 while valve 17 by-passes to the engine through 18.

By using the valves to stop the flow in their respective lines it is possible to maintain the wing in any attitude for any length of time and then change the angle to a larger value even when the engine is not running.

The wing contains a mechanism similar to that described in my Patent Number 1,691,942 and is briefly as follows: The air turbine 22 drives the blower 23 which removes air from the wing surface by drawing it through the holes 24 and the duct 25. By removing the air from the wing large lifting capacity is attained and the angles become very large.

I claim:

1. In an aircraft a means of varying the inclination of the wings relative to the fuselage by means of fluid pressure from the power plant, said means operating automatically when the power output of the motor falls below a predetermined value.

2. In an aircraft a means of varying the inclination of the wings relative to the fuselage by means of fluid pressure from the power plant, said means operating automatically when the power output of the motor falls below a predetermined value, and means of interrupting the automatic action.

3. In an aircraft a means of varying the inclination of the wings relative to the fuselage and operated by fluid suction from the intake manifold of the engine, said means operating automatically when the power of the engine falls below a predetermined value.

4. In an aircraft a means of varying the inclination of the wings relative to the fuselage, and operated by the pressure differential existing between the fluid of the intake manifold, and the fluid in another part of the engine.

5. In an aircraft a means of restraining the rotation of the wings relative to the fuselage by means of a differential of fluid pressure, existing between two parts of the engine and so devised that when the engine power falls below a predetermined value, the wing automatically assumes a predetermined angular setting relative to the fuselage.

6. In combination in an aircraft, a wing possessing openings in the wing surface, a passage connecting the upper and lower surfaces of the wing, a prime mover located in the passage and actuating a means of causing a flow through the openings, and means functioning with fluid pressure to permit the rotation of the wings automatically when the power of the motor falls below a predetermined value.

7. In combination in an aircraft, a wing possessing openings in the wing surface, a passage connecting the upper and lower surfaces of the wing, a prime mover located in the passage and actuating a means of causing a flow through the openings, and means functioning with fluid pressure to permit the rotation of the wings automaticaly when the power of the motor falls below a predetermined value, and means of interrupting the automatic action.

EDWARD A. STALKER.